E. GUELFF, L. S. DUNN & V. THENIS.
GLASS DRAWING APPARATUS.
APPLICATION FILED SEPT. 5, 1912.
1,134,192.
Patented Apr. 6, 1915.
4 SHEETS—SHEET 1.
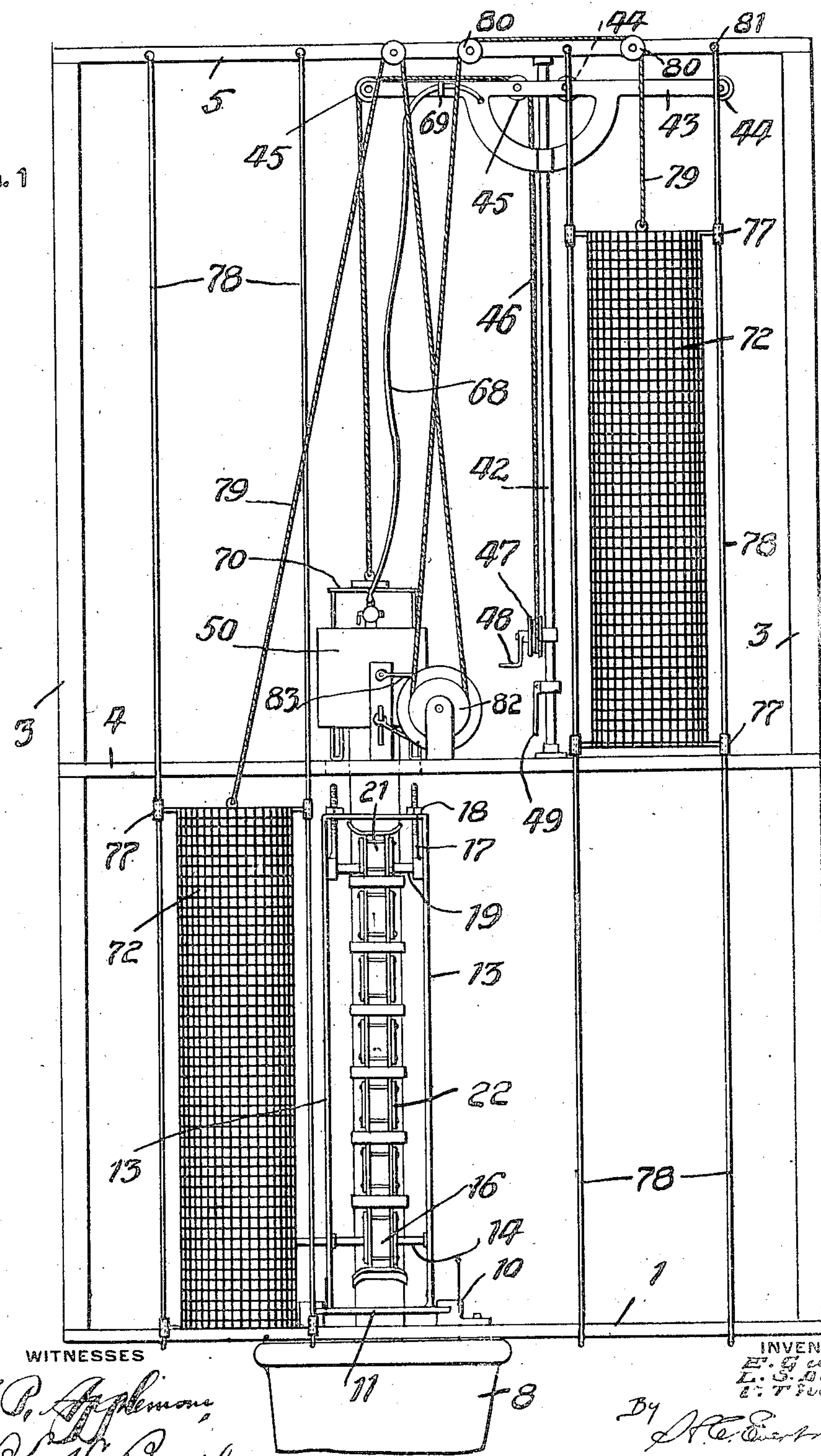
WITNESSES
INVENTORS
E. Guelff
L. S. Dunn
V. Thenis
By E. GUELFF, L. S. DUNN & V. THENIS.
GLASS DRAWING APPARATUS.
APPLICATION FILED SEPT. 5, 1912.
1,134,192.
Patented Apr. 6, 1915.
4 SHEETS—SHEET 2.
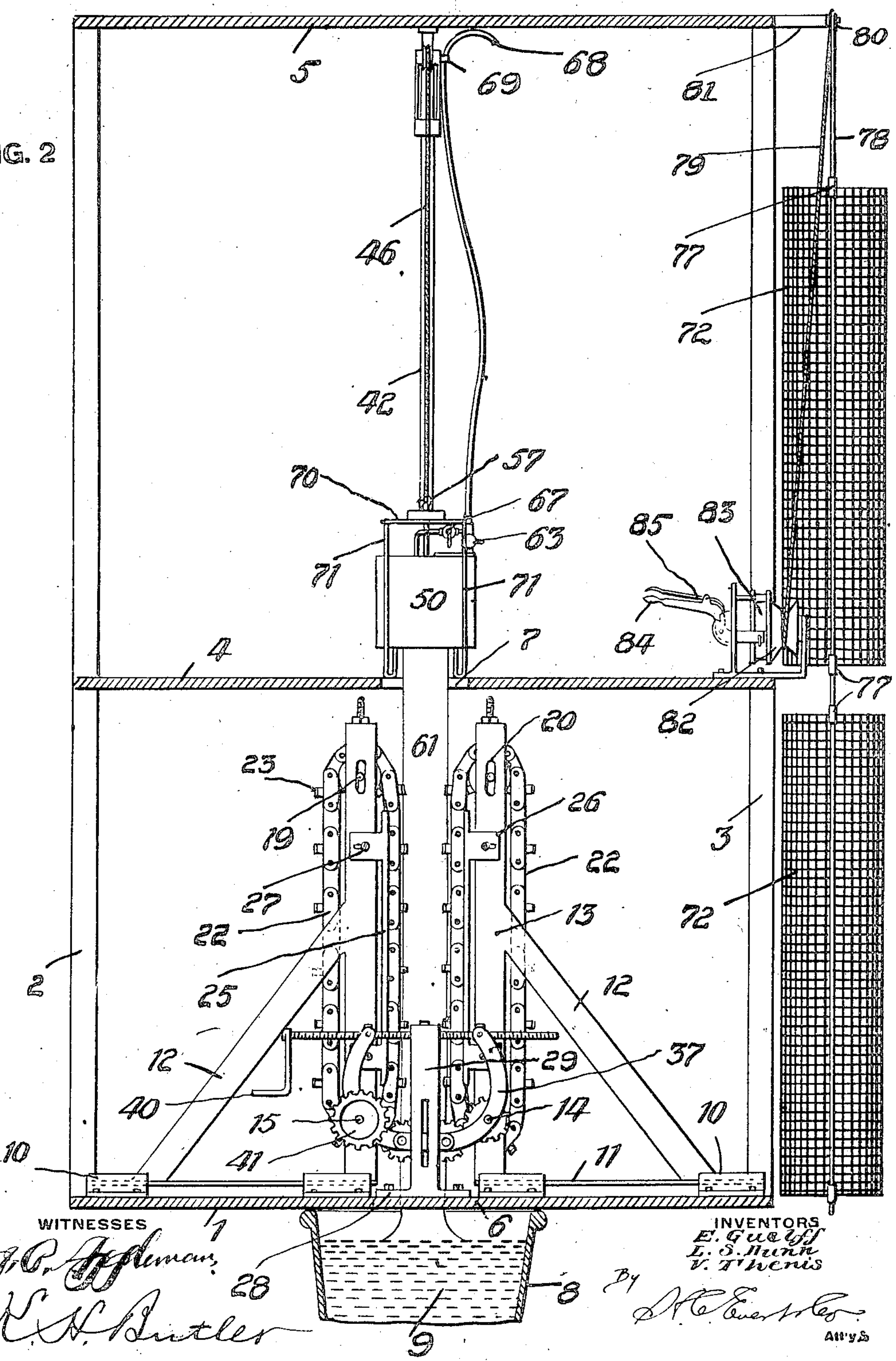
WITNESSES
INVENTORS
E. Guelff
L. S. Dunn
V. Thenis
By
Att'ys E. GUELFF, L. S. DUNN & V. THENIS.
GLASS DRAWING APPARATUS.
APPLICATION FILED SEPT. 5, 1912.
1,134,192.
Patented Apr. 6, 1915.
4 SHEETS—SHEET 3.
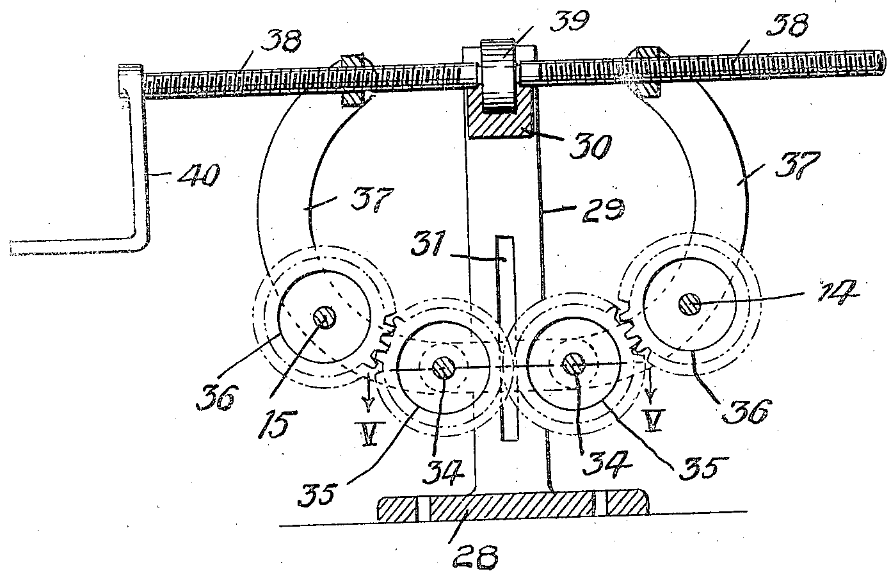
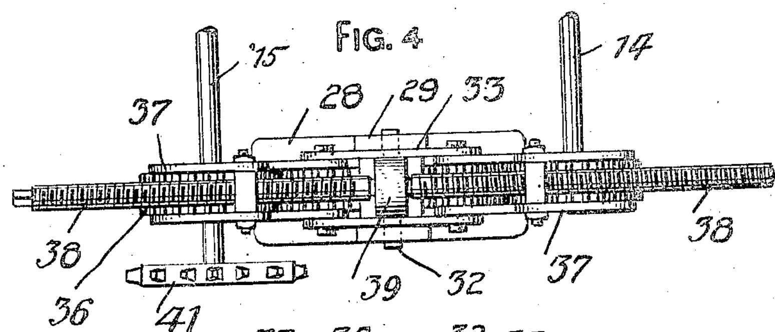
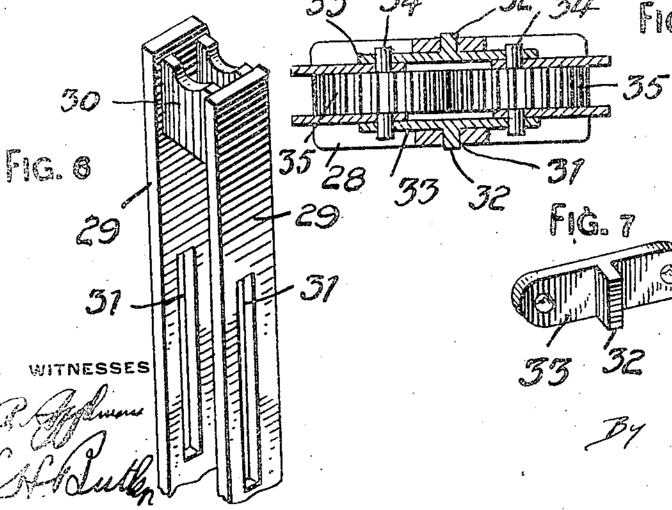
WITNESSES
INVENTORS
E. Guelff
L. S. Dunn
V. Thenis
By
Att'ys E. GUELFF, L. S. DUNN & V. THENIS.
GLASS DRAWING APPARATUS.
APPLICATION FILED SEPT. 5, 1912.
1,134,192.
Patented Apr. 6, 1915.
4 SHEETS—SHEET 4.
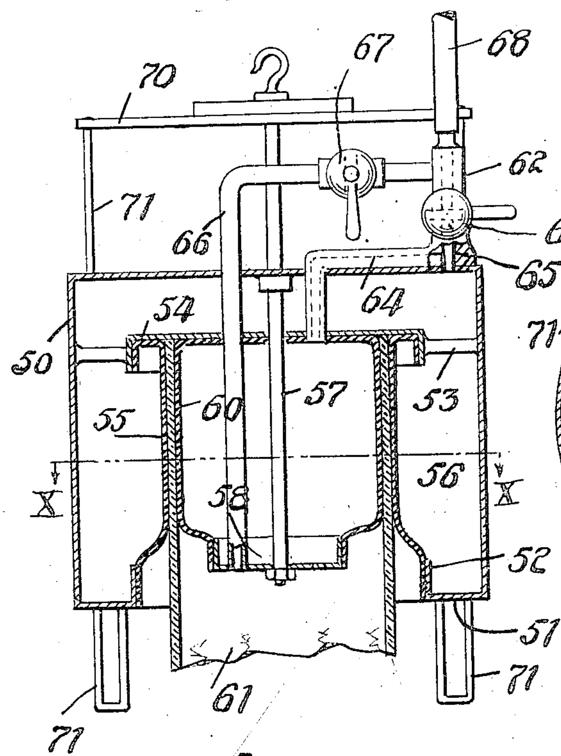
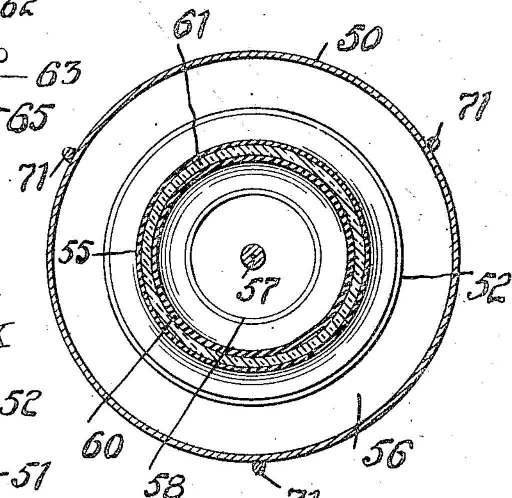
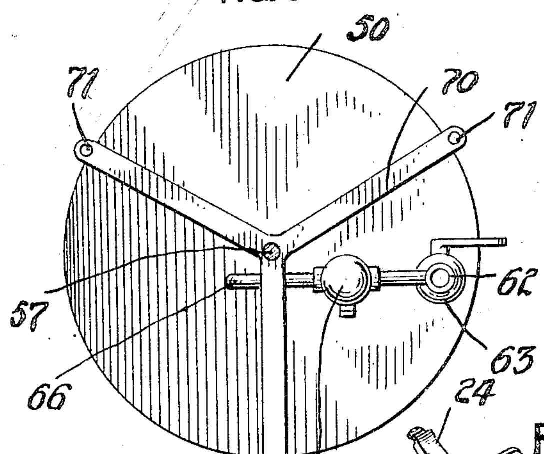
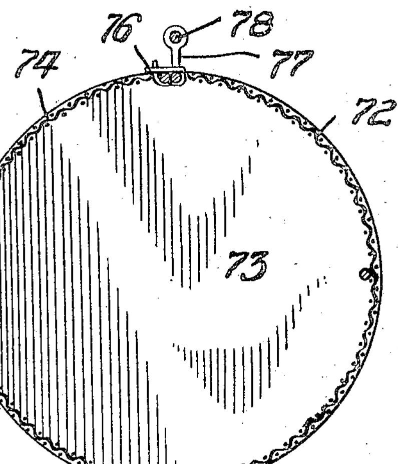
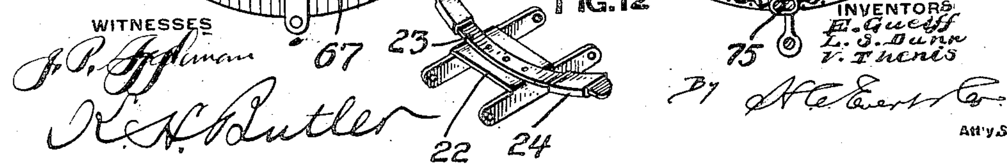
WITNESSES
J. P. Jaffman
R. A. Butler
INVENTORS
E. Guelff
L. S. Dunn
V. Thenis
By H. C. Evert & Co.
Att'ys

UNITED STATES PATENT OFFICE.

ELISÉE GUELFF, LEON S. DUNN, AND VICTOR THENIS, OF POINT MARION, PENNSYLVANIA.

GLASS-DRAWING APPARATUS.

1,134,192. Specification of Letters Patent. Patented Apr. 6, 1915.

Application filed September 5, 1912. Serial No. 718,771.

*To all whom it may concern:*

Be it known that we, ELISÉE GUELFF, LEON S. DUNN, and VICTOR THENIS, citizens of the United States of America, residing at Point Marion, in the county of Fayette and State of Pennsylvania, have invented certain new and useful Improvements in Glass-Drawing Apparatus, of which the following is a specification, reference being had therein to the accompanying drawing.

This invention relates to a glass drawing apparatus, and the invention aims to provide positive and reliable means, as hereinafter set forth, for safely, economically and expeditiously drawing glass to a cylinder form, the operation being continuously carried on for obtaining glass cylinders of any desired length.

The invention further aims to provide an apparatus of the above type that can be advantageously used in connection with a continuous process, the apparatus involving simple and effective means whereby glass cylinders of various dimensions can be drawn of desired lengths.

The invention still further aims to accomplish the above results by an apparatus that permits of drawn and cut cylinders being safely handled and transferred to a desired point.

The invention will be hereinafter specifically described and then claimed, and reference will now be had to the drawings, wherein there is illustrated a preferred embodiment of the invention, but it is to be understood that the structural elements are susceptible to such changes, as in size, shape and manner of assemblage, as fall within the scope of the appended claims.

In the drawings, wherein like numerals denote corresponding parts throughout the several views:—Figure 1 is a side elevation of the apparatus, Fig. 2 is a front elevation of the same, partly in section, Fig. 3 is an enlarged detail sectional view of the adjusting mechanism forming part of the endless cylinder guides and conveyer, Fig. 4 is a plan of the same, Fig. 5 is a horizontal sectional view of a portion of the adjusting mechanism taken on the line V—V of Fig. 3, Fig. 6 is a perspective view of a portion of a bearing forming part of the apparatus. Fig. 7 is a perspective view of a detached cross head used in connection with the bearing shown in Fig. 6, Fig. 8 is an enlarged vertical sectional view of a penumatic drawing head, Fig. 9 is a plan of the same, Fig. 10 is a horizontal sectional view of the drawing head taken on the line X—X of Fig. 8, Fig. 11 is an enlarged horizontal sectional view of one of the cylinder elevators and Fig. 12 is a perspective view of a detached conveyer member.

An apparatus in accordance with this invention embodies a frame work that can be erected in a factory, the frame work having platforms representing different working floors of the factory. The frame work supports an adjustable endless cylinder guide and conveyer that is located in proximity to a glass pot, tank or other receptacle from which molten glass can be drawn. Provision is made in connection with the guide and conveyer whereby it can be easily and quickly adjusted, without interfering with the operating mechanism thereof, for guiding and moving cylinders of various sizes. Located above the guide and conveyer is a derrick having a pneumatic drawing head that supplies air to a drawn cylinder and maintains the same in cylinder form. Located in proximity to the derrick is a cylinder elevator by which drawn and cut cylinders can be lowered to another department of the factory.

The principal elements of the invention, as mentioned above, will be hereinafter separately and specifically described in detail and reference will now be had to the frame work.

*Frame work.*—The frame work as illustrated in Figs. 1 and 2 comprises a main floor 1 provided with uprights 2 and 3 supporting a superimposed floor 4 and a roof or another floor 5, this frame work being easily embodied in a factory structure. The floors 1 and 4 have vertically alining openings 6 and 7 respectively that are directly above a conventional form of glass pot, tank or receptacle 8 containing molten glass 9. The frame work can be made of wood or metal and suitably braced throughout.

*Endless cylinder guides and conveyer.*—Located upon the floor 1 are sets of longitudinally alining bearings 10 for the lateral flanges 11 of oppositely disposed angle frames 12, each frame having an upright 13.

The flanges 11 and frames 12 are adjustable in the bearings 10. The uprights of each frame have the upper ends thereof connected together and journaled in the lower ends of said uprights are transverse shafts 14 and 15 provided with sprocket wheels 16. The upper ends of the uprights 13 are provided with hangers 17 adjusted through the medium of nuts 18. The hangers 17 support revoluble shafts 19 having the ends thereof extending into guide slots 20 provided therefor in the uprights. The shafts 19 are provided with sprocket wheels 21 and passing over said wheels and the wheels 16 are endless sprocket chains 22 that support curved members 23 having the ends thereof provided with yieldable sleeves or cushions 24. The members 23 made of layers of asbestos are equally spaced and the members of one chain confront the members of the other chain, as best shown in Fig. 2. The sprocket chains 22 at the confronting sides of the uprights are braced by adjustable plates 25 having side arms 26 adjustably connected by screws 27 to the outer sides of the uprights 13. The plates 25 prevent the chains from yielding or sagging when coöperating in elevating a cylinder.

*Adjusting and operating mechanism of the cylinder guides and conveyer.*—Located adjacent to the guides just described is a mechanism for moving the angle frames and operating the endless sprocket chains thereof, this mechanism being illustrated in Figs. 2 to 7 inclusive. The mechanism comprises a bearing 28 located at one side of the opening 6 and at one side of the endless guides. The bearing has two upright parallel arms 29 connected by a socket 30. The arms 29 are longitudinally slotted, as at 31, and extending into said slots are the tongues 32 of cross heads 33. The cross heads 33 are arranged at the inner sides of the arms and journaled in said cross heads are the spindles 34 of meshing gear wheels 35. These gear wheels mesh with gear wheels 36 mounted upon the shafts 14 and 15, said shafts extending through curved yokes 37 pivotally mounted upon the spindles 34 of the gear wheels 35. Extending through the upper ends of the yokes 37 are screws 38 having the inner ends thereof connected by a coupling head 39 that is rotatably mounted in the socket 30 carried by the arms 29. The end of one of the screws 38 has a crank 40, whereby said screws can be revolved and the yokes adjusted thereon. As the yokes are adjusted the cross heads 33 are raised and lowered in the parallel arms 29 and the shafts 14 and 15 are moved toward or away from each other, thereby shifting the angle frames supporting the endless sprocket chains. The end of the shaft 15 has a large sprocket wheel 41, whereby power from a motor or other suitable source can be employed for imparting movement to the gear wheels 35 and 36 and the sprocket wheels 16 and 21.

*Drawing head derrick.*—Arranged upon the superimposed floor 4 is a drawing head derrick, comprising a swiveled mast 42 having the ends thereof supported by the floors 4 and 5. The upper end of the mast has fixed thereto a cross head or boom 43 provided with revoluble sheaves 44 and 45. The former can be used in connection with an additional drawing head and passing over the latter is a cable 46 that is attached to and wound upon a drum 47 supported by the mast 42, said drum having a crank 48 whereby the cable 46 can be easily wound or unwound upon the drum. The mast 42 has a pivoted crank 49 that can be used for swinging the derrick, as will appear in the general operation of the apparatus.

*Drawing head.*—Reference will now be had to Figs. 1, 8 to 9 inclusive showing a drawing head, comprising a cylindrical casing 50 that has the upper end thereof closed and the lower end open and shaped to provide an inwardly projecting annular flange 51 that has a collar 52. The casing 50 has inwardly projecting arms 53 supporting an inverted cup 54 having the side thereof vertically alining with the collar 52. The collar 52 and the cup 54 are spaced apart and connected by a flexible sleeve 55, of expansible material, said sleeve having the ends thereof suitably connected to the collar 52 and the cup 54. The sleeve 55 coöperates with the casing 50 in providing an exterior air compartment 56, the inner wall of which is formed by the sleeve 55, consequently the inner wall of said compartment can be expanded to increase the area of said compartment. The casing 50 is provided with a hanger 57 extending into said casing and the inner end of said hanger supports a cup 58. The cup 58 coöperates with the inverted cup 54 in supporting a flexible and inflatable clamping member 60, said member coöperating with the sleeve 55 in gripping the upper end of a cylinder 61. The elements 55 and 60 are lined with rubber. Arranged upon the top of the casing 50 is a valve body 62 provided with a twoway valve 63 which may exhaust to the atmosphere. The valve body 62 has a pipe 64 extending through the top of the casing into the inverted cup 54 and in communication with the interior of the clamping member 60. The pipe 64 constitutes an air inlet pipe, and the valve body 62 is in communication with the air compartment 56 through the medium of a port 65, whereby said compartment can be filled with air. The valve body 62, has a pipe 66 extending through the casing 50 and in communication with the interior of the cylinder 61. This pipe is provided with a twoway valve 67 whereby the same can be closed and a pressure of air maintained in the clamping member 60 or said valve adjusted whereby said clamping member can exhaust to the atmosphere. The valves 63 and 67 are of the ordinary and well known type, and connected to the valve body 62 is a flexible air supply pipe 68. This pipe is preferably in the form of a hose and the upper end thereof is loosely supported, as at 69 by the boom 43 of the derrick previously referred to. The upper end of the hanger 57 is connected to the cable 46 and is provided with a spider 70. The spider has depending legs 71 that extend below the lower end of the casing 50, whereby the drawing head can rest upon the floor 4 above the opening 7 thereof. From the above description it will be observed that the drawing head comprises a casing having inner and outer expansible or retractible walls that coöperate in gripping, without danger of breakage, the upper end of a cylinder. The expansion of the walls of the casing is accomplished by a pressure of air and the retraction of said walls by an exhaust of the compressed air within the casing.

*Cylinder elevator.*—Reference being had to Figs. 1, 2 and 11, it will be observed that the side of the frame work is provided with means for lowering cylinders. The means is in the form of an elevator comprising woven wire cylindrical cages 72 having heads 73 and movable sections 74, whereby cylinders can be easily placed in the cages. The cages 72 are counter-balanced by each other as will in a manner be hereinafter more specifically referred to. The movable sections 74 are hinged, as at 75 and locked in a closed position by a conventional form of catch 76, the movable sections 74 swinging somewhat similar to doors. The heads 73 are provided with diametrically opposed guides 77 that slide upon vertical guide rods 78 arranged in parallelism and extending from the floor 1 to the floor 5, as best shown in Fig. 1. Connected to the upper heads 73 of the cages 72 are the ends of a cable 79 that passes over revoluble sheaves 80, carried by brackets 81 secured to the side of the frame work. The cable 79 is wound upon a revoluble sheave or pulley 82 and the movement of this sheave or pulley is controlled by a brake-band 83, a lever 84 and a ratchet mechanism 85, said ratchet mechanism permitting of the lever 84 being locked, whereby one of the cages can be safely loaded prior to descending. The weight of a cylinder in one of the cages is sufficient to elevate the empty cage, consequently a cage is always moved into position to be loaded. In making the cages of interwoven wire or a foraminous body, air is permitted to circulate through the same and cool the cylinders carried thereby.

*General operation.*—In operation, an ordinary bait, forming no part of this invention, is first utilized for drawing the glass 9 from the pot 8, starting the formation of a cylinder, the glass being drawn as far as the floor 4, whereby the drawing head 50 can be substituted for the ordinary bait. After the glass has been drawn this far and connected to the drawing head 50, the drawing of glass from the pot 8 can be continuously carried on as long as molten glass is supplied to the pot 8. It is through the medium of the mechanism shown in Figs. 3 to 7 inclusive that the endless oppositely disposed chains can be adjusted to coöperate with the drawing head in drawing a cylinder from the pot 8. The drawing head 50 not only holds and guides the end of the cylinder 61, but supplies air whereby the cylinder will be maintained in a blown form. After the drawing head has been elevated a desired distance, the cylinder can be cut by the ordinary and well known means and the derrick swung to one side to place a cylinder in one of the cages 72. After the cylinder has been deposited in the cage 72, the drawing head can be removed and swung and lowered to clamp the upper end of the cylinder held by the endless guides. While the drawing head is swinging a section of cylinder onto the elevator, there is a cessation in the operation of the cages until the drawing head can be returned and clamped upon the end of the cylinder to be further drawn. The elements 55 and 60 cannot be injured or spoiled by the heat due to the fact that the cylinder is elevated thirty feet above the level of the melting tank before the elements 55 and 60 are brought into action so these latter cannot be spoiled by the heat for the reason that the cylinder is sufficiently cool to enable one to set his hands thereon. If at any time the cylinder would be too hot, a fan is employed to cool it off.

We attach considerable importance to the construction of the drawing head, particularly the inner expansible walls that frictionally grip the end of the cylinder and provide a non-leaking and air tight connection whereby air can be supplied to the cylinder. The supply of air to the cylinder is only necessary while the endless guides are in operation and molten glass is being withdrawn from the pot 8.

What we claims is:—

1. In a glass drawing apparatus, a frame work, cylinder chains arranged upon said frame work for moving a cylinder vertically thereof, a drawing head movably supported in said frame work, said drawing head comprising a casing, expansible walls arranged in said casing for gripping the end of a cylinder movable between said chains, and means for supplying air to said casing to expand the walls within said casing.

2. In a glass drawing apparatus, the combination with a drawing head, of adjustable oppositely disposed endless guides, said guides comprising angle frames, sprocket chains movable between said frames, cylinder gripping members carried by said chains, means for imparting movement to said chains, and means including pivoted yokes for adjusting said angle frames whereby cylinders of various diameters can be moved by said guides.

3. In a glass drawing apparatus, the combination with a glass pot, laterally adjustable chains located above said glass pot, and means for adjusting said chains, of a pneumatic drawing head adapted to move and draw a cylinder between said chains, said drawing head comprising a casing, flexible expansible walls arranged within said casing for gripping the upper end of a cylinder, means for supplying air to said casing to expand said walls, and means for elevating said drawing head.

In testimony whereof we affix our signatures in the presence of two witnesses.

ELISÉE GUELFF.
LEON S. DUNN.
VICTOR THENIS.

Witnesses:
GEORGES DEBUCEY,
LEON DUMONT.